United States Patent [19]
Kwon

[11] Patent Number: 5,703,443
[45] Date of Patent: Dec. 30, 1997

[54] HORIZONTAL DEFLECTION OUTPUT CIRCUIT

[75] Inventor: Joong-Yeol Kwon, Kyungki-do, Rep. of Korea

[73] Assignee: SamSung Electronics Co., Ltd., Kyungki-do, Rep. of Korea

[21] Appl. No.: 770,511

[22] Filed: Dec. 20, 1996

[30] Foreign Application Priority Data

Mar. 29, 1996 [KR] Rep. of Korea .................. 9316/1996

[51] Int. Cl.$^6$ ............................................. H01Q 1/00
[52] U.S. Cl. .................... 315/370; 315/408; 315/398
[58] Field of Search ............................ 315/408, 370, 315/398

[56] References Cited

U.S. PATENT DOCUMENTS

| | | | |
|---|---|---|---|
| 4,649,325 | 3/1987 | Guerin et al. | 315/383 |
| 4,703,233 | 10/1987 | Rodriguez-Cavazos | 315/398 |
| 4,707,640 | 11/1987 | Onozwa et al. | 315/408 |

*Primary Examiner*—Theodore M. Blum
*Attorney, Agent, or Firm*—Robert E. Bushnell, Esq.

[57] ABSTRACT

Disclosed is a horizontal deflection output circuit for providing a horizontal deflection signal to a deflection yoke of a cathode ray tube to horizontally deflect electron beams in accordance with the horizontal deflection signal, the horizontal deflection output circuit having a switching transistor responsive to a horizontal output driving pulse signal applied at its base, an emitter of the switching transistor being connected to a ground terminal, a deflection yoke coupled between a first node at a collector of the switching transistor and a second node, a S-deflection distortion correcting capacitor coupled between the second node and the ground terminal, and a dampening diode and a retrace capacitor coupled in parallel between the first node and the ground terminal, the horizontal deflection output circuit comprising, a choke coil connected between a voltage source and the second node, the choke coil reducing power loss in the horizontal deflection output circuit and providing a power loss current indicative of the power loss to the deflection yoke, and a raster position correcting circuit coupled between the first node and the second node, the raster position correcting circuit providing a correction voltage to the first node for correcting a distorted raster position caused by a DC signal corresponding to the power loss current during a trace interval.

14 Claims, 4 Drawing Sheets

HORIZONTAL DEFLECTION OUTPUT CIRCUIT

CLAIM OF PRIORITY

This application makes reference to, incorporates the same herein, and claims all benefits accruing under 35 U.S.C. §119, from an application entitled *A Horizontal Deflection Output Circuit* earlier filed in the Korean Industrial Property Office on the 29$^{th}$ of March 1996, and there duly assigned Serial No. 96-9316 by that Office.

BACKGROUND OF THE INVENTION

1. Field of the Invention

The present invention relates to video circuits and processes generally, and more particularly, to horizontal deflection processes and output circuits used to drive television receivers and computer monitors having cathode ray tubes used to display an image thereon, so as to control horizontal deflection of electron beams within the tube.

2. Background Art

Typically a monitor circuit for a typical personal computer is provided to control a cathode ray tube for receiving image information from the computer and displaying an image corresponding to the image information. The image information from the computer is changed into video signals of R(red), G(green) and B(blue) and synchronizing signals which are adapted to the monitor circuit by means of an input processor. Of the changed signals, the video signals are amplified and the amplified video signals are supplied to electron guns within the cathode ray tube in order to emit electron beams. The synchronizing signals, i.e., horizontal and vertical synchronizing signals, are applied through horizontal and a vertical deflection circuits to horizontal and vertical deflection yokes, respectively. Accordingly the electron beams are deflected by the control of the deflection circuits in horizontal and vertical directions relative to the beam emitting direction, respectively.

The horizontal deflection circuit may include, for example, a phase locked loop (PLL) circuit for generating a fly-back signal used to remove a drift during the absence of the horizontal synchronizing signal, a horizontal oscillator for generating a sawtooth wave signal, a horizontal drive circuit for generating a horizontal output driving pulse signal and correcting the wave form thereof, and a horizontal deflection output circuit for supplying a saw-tooth wave current to a horizontal deflection yoke.

A horizontal deflection output circuit such as is represented by Rodriguez-Cavazos, U.S. Pat. No. 4,703,233 for a *Television Receiver Having Single Pole Double Throw Rotary Switch And Centering Switch*, will generally be constructed with a transistor functioning as a switch, which is operated in response to a horizontal output driving pulse signal applied through a base thereof, a choke coil is coupled to the collector of the transistor to provide compensation for power loss caused by the deflection yoke, a damper diode and a retrace capacitor connected in parallel between a ground terminal and the collector of the transistor, a S-deflection distortion correcting capacitor, and an inductor for maintaining a S-deflection distortion correcting voltage charged in the S-deflection distortion correcting capacitor. Additionally, a raster position correcting circuit may be included for correcting a raster position.

The S-deflection distortion correcting capacitor is provided to correct for S-deflection distortion and to prevent a DC (direct current) signal from being induced to the deflection yoke. Particularly, since the S-deflection distortion correcting capacitor is typically connected in series with the deflection yoke, the DC signal seldom flows through the deflection yoke. As a result, it is possible to perform a symmetrical raster scan relative to a beam spot center on a screen.

In the horizontal deflection output circuit, because an error of the beam spot center may be corrected in accordance with a DC voltage of the raster position correcting circuit, an inductor is required to maintain the S-deflection distortion correcting voltage which is charged in the S-deflection distortion correcting capacitor.

In the horizontal deflection output circuit, a high voltage pulse signal having amplitudes of 1000 to 1500 Volts must be applied to the collector of the transistor. To obtain such a high voltage, the choke coil must have a considerable increase in size. This raises several problems such as product cost can not be reduced and the monitor circuit can not be reduced in size. Also as the choke coil is made larger and larger, a voltage loss increases more and more. As a result, the monitor circuit is degraded in quality.

SUMMARY OF THE INVENTION

It is therefore, an object of the present invention to provide an improved video process and circuit.

It is another object to provide a horizontal deflection process and output circuit exhibiting small size and low power loss.

According to one aspect of the present invention, a horizontal deflection output circuit for providing a horizontal deflection signal to a deflection yoke of a cathode ray tube to horizontally deflect electron beams in accordance with the horizontal deflection signal, the horizontal deflection output circuit having a switching transistor responsive to a horizontal output driving pulse signal applied at its base, an emitter of the switching transistor being connected to a ground terminal, a deflection yoke coupled between a first node at a collector of the switching transistor and a second node, a S-deflection distortion correcting capacitor coupled between the second node and the ground terminal, and a dampening diode and a retrace capacitor coupled in parallel between the first node and the ground terminal. The horizontal deflection output circuit may be constructed with a choke coil connected between a voltage source and the second node, the choke coil reducing power loss in the horizontal deflection output circuit and providing a power loss current indicative of the power loss to the deflection yoke, and a raster position correcting circuit coupled between the first node and the second node, the raster position correcting circuit providing a correction voltage to the first node for correcting a distorted raster position caused by a DC signal corresponding to the power loss current during a trace interval.

As described above, because the horizontal deflection output circuit has a power supplying choke coil coupled to the correction capacitor for charging a relatively low voltage, AC Current and voltage are not applied to the choke coil. As a result, a power loss almost occurs through the choke coil and a size of the choke coil can be minimized.

BRIEF DESCRIPTION OF THE ATTACHED DRAWINGS

A more complete appreciation of this invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF PREFERRED EMBODIMENT

Figure 1:
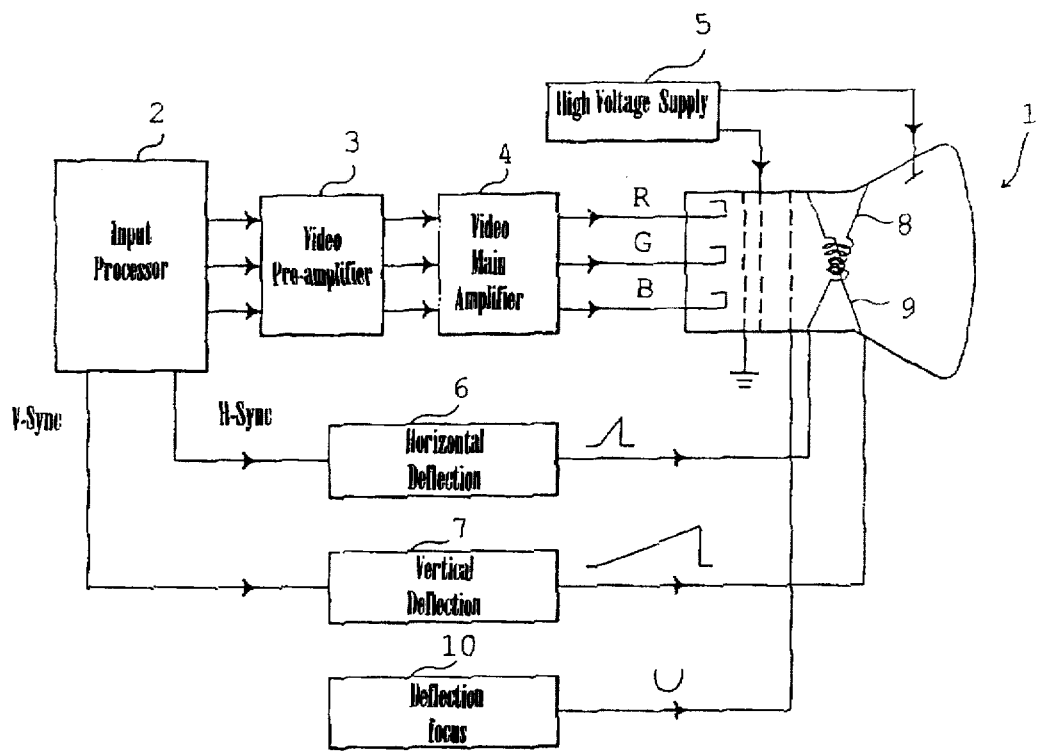
FIG. 1 is a block diagram showing an abstract representation of a hypothetical exemplary monitor circuit suitable for use in a typical computer system.

FIG. 1 illustrates an exemplary monitor circuit for a typical personal computer. As shown in FIG. 1, the monitor circuit is provided to control a cathode ray tube 1 for displaying an image corresponding to the image information in response to received image information from the computer. The information from the computer is changed into R (red), G (green) and B (blue) video signals and synchronizing signals which are adapted to the monitor circuit by means of an input processor 2. Of the changed signals, the video signals are applied through a video pre-amplifier 3 to a video main amplifier 4 to be amplified. The amplified video signals are supplied to electron guns within cathode ray tube 1 to emit electron beams. The synchronizing signals, i.e., horizontal and vertical synchronizing signals, are applied through a horizontal deflection circuit 6 and a vertical deflection circuit 7 to horizontal and vertical deflection yokes 8 and 9, respectively. Accordingly the electron beams are deflected in horizontal and vertical directions relative to the beam emitting direction by deflection circuits 6 and 7, respectively. Reference numeral 5 is a high voltage power supply for generating a high voltage, which is supplied to an anode of the cathode ray tube 1, and 10 is a deflection yoke focus generator.

Figure 2:
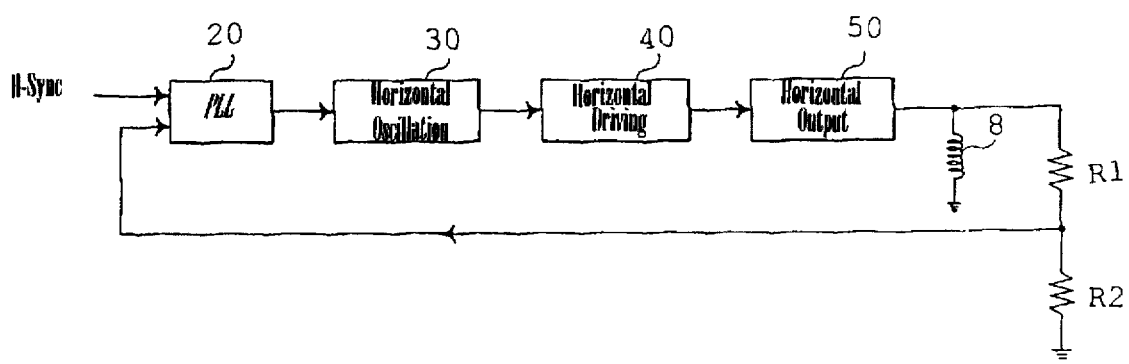
FIG. 2 is a block diagram indicative of a horizontal deflection circuit usable in the exemplary monitor circuit shown in FIG. 1.

As shown in FIG. 2, the horizontal deflection circuit 6 may be comprised of a PLL (Phase Locked Loop) circuit 20 for generating a fly-back signal used to remove drift during the absence of a horizontal synchronizing signal, a horizontal oscillator 30 for generating a sawtooth wave signal, a horizontal drive circuit 40 for generating a horizontal output driving pulse signal, and a horizontal deflection output circuit 50 for supplying a saw-tooth wave current to horizontal deflection yoke 8.

Figure 3:
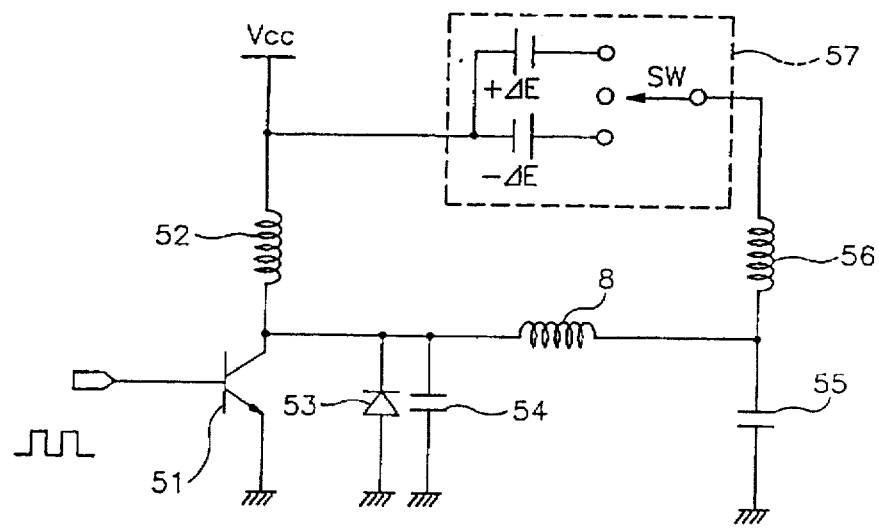
FIG. 3 is a detailed exemplary circuit diagram of a horizontal deflection output circuit usable in the horizontal deflection circuit shown in FIG. 2.

As shown in FIG. 3, the horizontal deflection output circuit 50 may be comprised of a switching transistor 51 responsive to a horizontal output driving pulse signal applied at its base, a choke coil 52 coupled to the collector of transistor 51 for compensating a power loss caused by deflection yoke 8, a damper diode 53 and a retrace capacitor 54 connected in parallel between a ground terminal and the collector of transistor 51, a capacitor 55 for correcting S-deflection distortion, an inductor 56 for maintaining a S-deflection distortion correcting voltage charged in capacitor 55, and a raster position correcting section 57 for positioning a raster position. Retrace capacitor 54 and deflection yoke 8 constitute a resonance circuit.

As described above, the capacitor 55 is provided to correct the S-deflection distortion and prevent a direct current signal from being induced to the deflection yoke 8. Particularly, since the capacitor 55 is connected in series with the deflection yoke 8, the direct current signal seldom flows through the deflection yoke 8. As a result, it is possible to perform a symmetrical raster scan relative to a beam spot center on a screen.

In the horizontal deflection output circuit, an error of the beam spot center may be corrected in accordance with a DC voltage $\pm \Delta E$ of the raster position correcting section 57, thus inductor 56 is required to maintain the S-deflection distortion correcting voltage which is charged in capacitor 55.

In the mean while, at one scanning interval T, a current flows through a choke coil 52 for supplying a power to the circuit so as to compensate for a power loss of the circuit. That is, a collector current 1, of transistor 51 can be obtained by the following equation (1):

$$I_C = \frac{V_{CC}}{L}(2t - T_R) + \frac{P_{LOSS}}{V_{CC}} \quad (1)$$

whereas:

L is an inductance of the choke coil 52,

TR is a retrace interval, and t is time.

Also, at a retrace interval TR, a collector current Ic and a collector voltage Vc of transistor 51 can be obtained from the following equations (2) and (3):

$$I_C = \frac{V_{CC} \cdot T_R}{L} \cos \frac{\pi}{T_R} t \quad (2)$$

$$V_C = \frac{\pi \cdot V_{CC} \cdot T_S}{2T_R} \sin \frac{\pi}{T_R} t \quad (3)$$

In the horizontal deflection output circuit, a high voltage pulse signal having 1000 to 1500 Volts must be applied to the collector of transistor 51. To obtain such a high voltage, however, choke coil 52 must considerably be increased in size. This raises several problems such as a product cost can not be reduced and the monitor circuit can not be reduced in size. Also as choke coil 52 is made larger and larger, voltage loss is increased more and more. As a result, the monitor circuit is degraded in quality.

Figure 4:
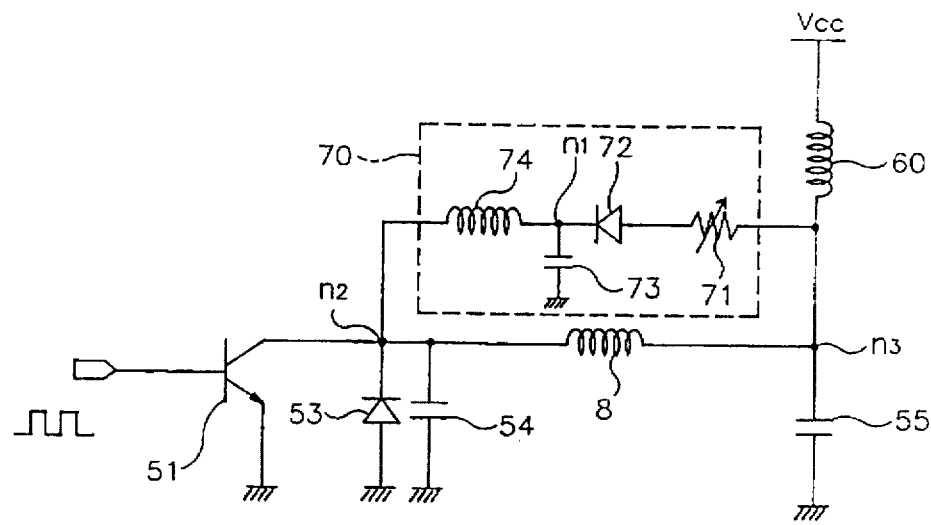
FIG. 4 is a circuit diagram of a horizontal deflection output circuit constructed according to the principles of the present invention.

Referring now to FIG. 4, a novel horizontal deflection output circuit in accordance with the present invention has a switching transistor 51 responsive to a horizontal output driving pulse signal applied at its base. The emitter of transistor 51 is coupled to a ground terminal and the collector is coupled to one terminal of the deflection yoke 8 at node n2. Between the ground terminal and the collector of the transistor 51, a damper diode 53 and a retrace capacitor 54 are connected in parallel. Retrace capacitor 54 and deflection yoke 8 constitute a resonance circuit. A capacitor 55 is coupled between the other terminal of the deflection yoke 8 at node n3 and the ground terminal to correct an S-deflection distortion. A choke coil 60 is coupled between node n3 and a voltage source Vcc, and a raster position correcting section 70 is coupled between the collector of the transistor 51 and node n3. Choke coil 60 which is coupled to a deflection distortion correcting capacitor 55 compensates for the circuits power loss. An inductance of choke coil 60 is set at least ten times larger than the inductance of deflection yoke 8.

Figure 5:
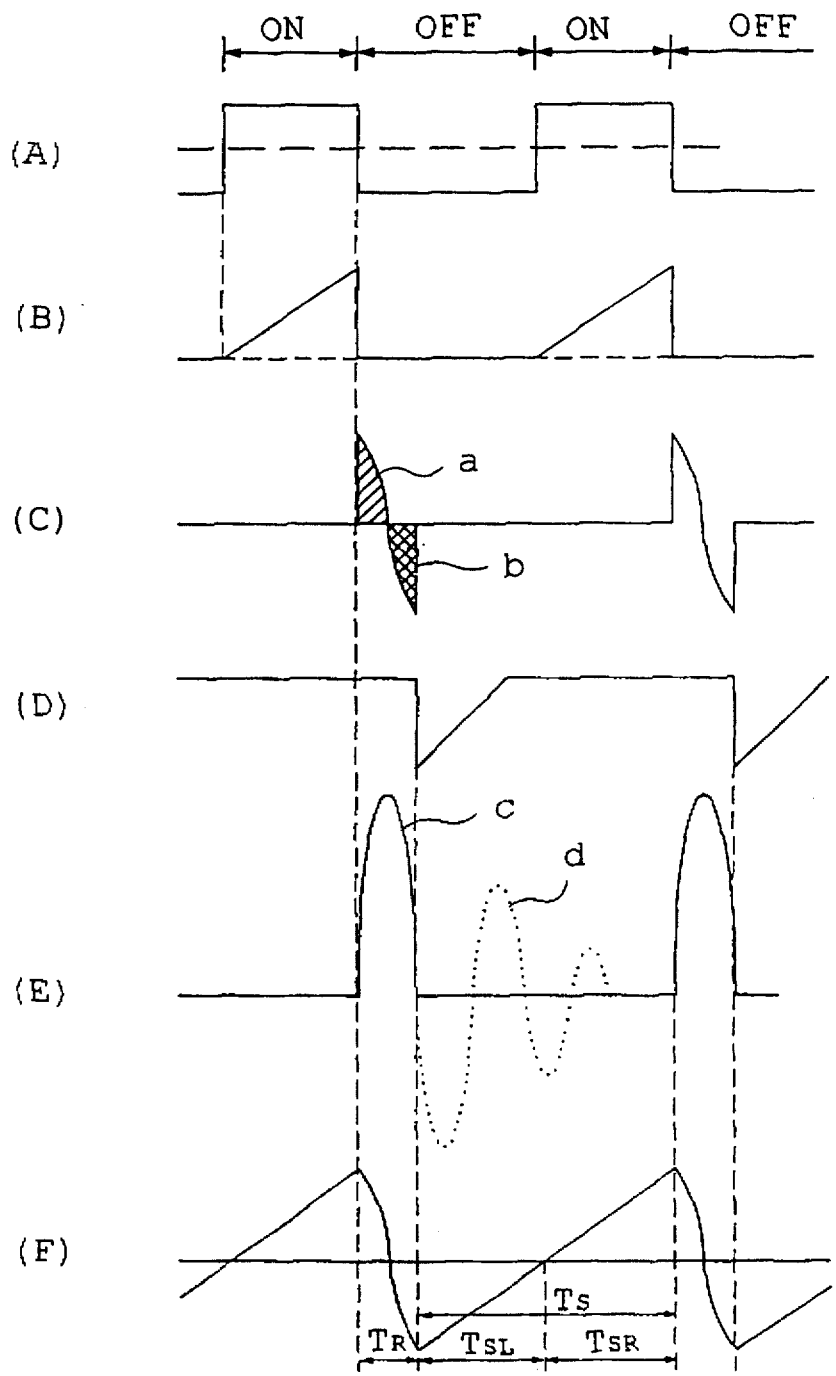
FIG. 5a–5f are diagrams showing waveforms of input and output signals of each component in the horizontal deflection output circuit represented by FIG. 4.

Regarding FIG. 5 with respect to the horizontal deflection output circuit as shown in FIG. 4, a horizontal output driving pulse signal A is applied to the base of transistor 51, which is turned on or off in response to the voltage level of pulse signal A. Then a current signal B is provided at the collector of the transistor 51. When transistor 51 is conductive, a current flowing through the choke coil 60 is increased and then a voltage drop occurs across the choke coil 60. As a result, the choke coil 60 saves electrical energy. When transistor 51 is turned off during the energy saving in the choke coil, the saved energy in choke coil 60 is changed into a current signal and flows through deflection yoke 8 and capacitor 54. Then retrace capacitor 54 is charged up to the level of Vcc.

Next, when transistor 51 is again turned on, an electric charge charged in capacitor 55 is discharged through deflection yoke 8 and transistor 51 to the ground. At this time, a deflection current flows through deflection yoke 8 and is gradually increased during the interval TSR of trace interval TS, as shown in FIG. 5(F). As a result, the scanning of the right half of a scan line is performed during the interval TSR.

Once transistor 51 is again turned off, a current signal changed from the saved energy of deflection yoke 8 flows through and charges retrace capacitor 54. The waveform of the current signal flowing through retrace capacitor 54 is shown by "a" of FIG. 5(C). As the current flowing through deflection yoke 8 is gradually decreased to be at a zero state in current mount, the charging operation of retrace capacitor 54 is completed. After that, a discharging operation of retrace capacitor 54 starts. Accordingly, the current flowing through deflection yoke 8 flows in a direction opposite to the current flowing direction during the charging of retrace capacitor 54. The current flowing through deflection yoke 8 during the discharging operation of retrace capacitor 54 has a waveform form shown by "b" of FIG. 5(C). At this time, the current flowing from retrace capacitor 54 to deflection yoke 8 is gradually increased.

In FIG. 5(E), "c" is a waveform of a collector voltage of transistor 51 when retrace capacitor 54 is charged and discharged. During retrace interval TR, FIG. 5(F) shows a waveform of deflection current when retrace capacitor 54 is charged and discharged.

Once the discharging of retrace capacitor 54 is completed, that is, when tile current flowing from retrace capacitor 54 to deflection yoke 8 is suddenly at a zero state, the polarity of induced voltage of deflection yoke 8 is changed. As a result, damper diode 53 is made conductive. A waveform of current flowing through the damper diode 53 is shown in FIG. 5(D). When damper diode 53 is made conductive an oscillation of a collector voltage of transistor 51 occurring or an oscillation of a deflection current flowing through tile deflection yoke 8 is restrained by the resonance circuit. Also it is possible to prevent the deflection current from be rapidly reduced to a zero state when the discharging of retrace capacitor 54 is completed. As a result, when the damper diode 53 is made conductive, the deflection current is gradually decreased during interval TSL of trace interval TS shown in FIG. 5(F). During interval TSL, the scanning of the left half of the scan line is performed. If damper diode 53 was not embodied in the horizontal deflection output circuit, a collector voltage of the transistor 51 would have a waveform shown by "d" of FIG. 5(E) by means of a resonance circuit composed of deflection yoke 8 and retrace capacitor 54.

Figure 6:
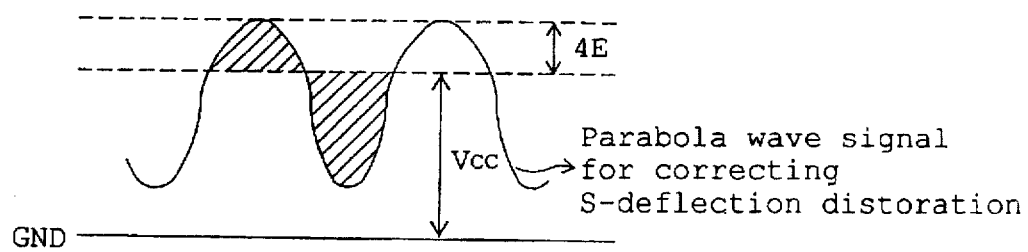
FIG. 6 is a waveform diagram of a voltage at a node n3 shown in FIG. 4.

Since a DC signal corresponding to a power loss flows through deflection yoke 8 and causes a raster position to be distorted, the horizontal deflection output circuit has the raster position correcting section 70 for correcting the distorted raster position. Raster position correcting section 70 comprises, in series between node n3 and node n2, a variable resistor 71, a diode 72 and an inductor 74, additionally, at node n1, which is a connection point between diode 72 and an inductor 74, a capacitor 73 is connected to a ground terminal. In raster position correcting section 70, diode 72 rectifies a peak of a parabola wave signal, shown in FIG. 6, which is supplied from capacitor 55 through variable resistor 71, and capacitor 73 smooths the rectified signal output from diode 72. At this time, a voltage at node n1 becomes ΔE, and a current signal at the node n1 flows through node n2 to node n3. The current signal at node n1 is used to correct the raster position. When a resistance value of the variable resistor 71 is adjusted so that an mount of the raster position correcting current signal is equal to that of a power loss compensating current flowing from the choke coil 60 to deflection yoke 8, the raster position distortion is caused by the DC signal corresponding to a power loss flowing through deflection yoke 8 is corrected for by raster position correcting section 70. An inductance of inductor 74 is set at least twenty times larger than that of choke coil 60.

As described above, because choke coil 60, which compensates for a power loss, is coupled to S-deflection distortion correcting capacitor 55, in which a relatively low voltage is charged, instead of a collector of switching transistor 51, which allows a high voltage pulse signal to be generated during retrace interval TR, the size of choke coil 60 can be reduced and a power loss can be reduced. Therefore, a horizontal deflection output circuit of a low cost and low power-consumption and high reliability is obtained.

What is claimed is:

1. A horizontal deflection output circuit for providing a horizontal deflection signal to a deflection yoke of a cathode ray robe to horizontally deflect electron beams in accordance with the horizontal deflection signal, said horizontal deflection output circuit comprising:

a switching transistor responsive to a horizontal output driving pulse signal applied at its base, an emitter of said switching transistor being connected to a ground terminal;

a deflection yoke coupled between a first node at a collector of said switching transistor and a second node;

a S-deflection distortion correcting capacitor coupled between said second node and said ground terminal;

a dampening diode and a retrace capacitor coupled in parallel between said first node and said ground terminal;

a choke coil connected between a voltage source and said second node, said choke coil reducing power loss in said horizontal deflection output circuit; and a raster position correcting means coupled between said first node and said second node, for correcting a distorted raster position caused by a DC signal, corresponding to said power loss, flowing through said deflection yoke during a trace interval.

2. The horizontal deflection output circuit as set forth in claim 1, said raster position correcting means comprising:

a variable resistor coupled between said second node and an anode of a diode;

an inductor coupled between said collector of said switching transistor and a cathode of said diode, said diode providing a position correcting current at said cathode; and a smoothing capacitor coupled between said cathode and said ground terminal.

3. The horizontal deflection output circuit as set forth in claim 2, a resistance value of said variable resistor being adjusted so that said position correcting current is equal to a power loss current provided to said deflection yoke from said choke coil.

4. The horizontal deflection output circuit as set forth in claim 2, said diode rectifying a parabolic waveform provided through said variable resistor from said S-deflection distortion correcting capacitor.

5. The horizontal deflection output circuit as set forth in claim 2, an inductance of said inductor being at least twenty times larger than an inductance of said choke coil.

6. The horizontal deflection output circuit as set forth in claim 1, an inductance of said choke coil being at least ten times larger than an inductance of said deflection yoke.

7. The horizontal deflection output circuit as set forth in claim 6, an inductance of said inductor being at least twenty times larger than said inductance of said choke coil.

8. A horizontal deflection circuit, comprising:

a terminal disposed to receive a horizontal deflection signal;

a deflection yoke of a cathode ray tube disposed to horizontally deflect electron beams in accordance with the horizontal deflection signal;

a switching transistor having a control electrode responsive to a horizontal output driving pulse signal, a first electrode to a principal electrical charge conducting channel of said switching transistor being connected to a ground terminal;

a deflection yoke coupled between a first node formed at a second electrode separated from said first electrode by said channel, and a second node;

a S-deflection distortion correcting capacitor coupled between said second node and said ground terminal;

a dampening diode and a retrace capacitor coupled in parallel between said first node and said ground terminal;

a choke coil connected between a voltage source and said second node, said choke coil reducing power loss in said horizontal deflection output circuit and providing a power loss current indicative of said power loss to said deflection yoke; and a raster position correcting means coupled between said first node and said second node, said raster position correcting means providing a correction voltage to said first node for correcting a distorted raster position caused by a DC signal corresponding to said power loss current during a trace interval.

9. The horizontal deflection circuit of claim 8, said raster position correcting means comprising:

a variable resistor coupled between said second node and an anode of a diode, said diode providing a position correcting current at its cathode;

a smoothing capacitor coupled between said cathode and said ground terminal for smoothing said position correcting current; and an inductor for providing a correction voltage to said first node in response to said position correcting current smoothed by said smoothing capacitor.

10. The horizontal deflection circuit of claim 9, a resistance value of said variable resistor being adjusted so that said position correcting current is equal to said power loss current provided to said deflection yoke from said choke coil.

11. The horizontal deflection circuit of claim 9, said diode rectifying a parabolic waveform provided through said variable resistor from said S-deflection distortion correcting capacitor.

12. The horizontal deflection circuit of claim 9, an inductance of said inductor being at least twenty times larger than an inductance of said choke coil.

13. The horizontal deflection circuit of claim 8, an inductance of said choke coil being at least ten times larger than an inductance of said deflection yoke.

14. The horizontal deflection circuit of claim 13, an inductance of said inductor being at least twenty times larger than said inductance of said choke coil.

* * * * *